United States Patent
Suzuki et al.

(10) Patent No.: US 7,308,882 B2
(45) Date of Patent: Dec. 18, 2007

(54) OIL FEEDING SYSTEM OF ENGINE

(75) Inventors: Kozo Suzuki, Kobe (JP); Yoji Fukami, Kakogawa (JP); Yosuke Nonaka, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 11/404,514

(22) Filed: Apr. 13, 2006

(65) Prior Publication Data

US 2006/0260873 A1 Nov. 23, 2006

(30) Foreign Application Priority Data

Apr. 14, 2005 (JP) ............... 2005-116796

(51) Int. Cl.
  *F01M 1/16* (2006.01)
  *F01M 3/04* (2006.01)
(52) U.S. Cl. .................. 123/196 CP; 123/196 M; 123/90.12
(58) Field of Classification Search ............ 123/196 R, 123/196 CP, 196 S, 196 M, 198 P, 90.12, 123/197.1, 197.5
See application file for complete search history.

(56) References Cited

U.S. PATENT DOCUMENTS

| | | | | |
|---|---|---|---|---|
| 5,517,959 A | * | 5/1996 | Kato et al. ............. | 123/196 AB |
| 5,857,441 A | * | 1/1999 | Yonezawa et al. ....... | 123/196 R |
| 5,908,367 A | * | 6/1999 | Tominaga et al. ............. | 477/45 |
| 5,950,591 A | * | 9/1999 | Kageyama et al. ....... | 123/196 S |
| 6,164,257 A | * | 12/2000 | Kobayashi ............... | 123/90.33 |
| 6,386,170 B1 | * | 5/2002 | Iwano et al. ............. | 123/196 R |
| 6,443,263 B1 | * | 9/2002 | Ito et al. ...................... | 184/6.5 |
| 6,491,010 B2 | * | 12/2002 | Kawamoto et al. ....... | 123/90.27 |
| 6,504,474 B1 | * | 1/2003 | Goodnight et al. ......... | 340/439 |
| 6,536,400 B1 | * | 3/2003 | Inumaru et al. ........ | 123/196 R |
| 6,598,705 B2 | * | 7/2003 | Ito et al. ...................... | 184/6.5 |
| 6,715,460 B2 | * | 4/2004 | Ashida et al. .......... | 123/196 R |
| 6,837,209 B2 | * | 1/2005 | Hori et al. .............. | 123/196 R |
| 7,021,267 B2 | * | 4/2006 | Kawakubo et al. ..... | 123/196 R |
| 7,036,310 B2 | * | 5/2006 | Aoki et al. .................... | 60/459 |
| 7,047,931 B2 | * | 5/2006 | Sluka et al. ............. | 123/198 C |
| 7,191,871 B2 | * | 3/2007 | Nakai et al. .................. | 184/6.5 |
| 2004/0069260 A1 | * | 4/2004 | Fujikubo ................. | 123/90.31 |
| 2004/0069266 A1 | * | 4/2004 | Fujikubo ................ | 123/196 R |
| 2005/0059528 A1 | * | 3/2005 | Janssen ...................... | 477/116 |
| 2005/0109290 A1 | * | 5/2005 | Matsuda ................. | 123/41.38 |
| 2006/0225689 A1 | * | 10/2006 | Matsuda ................. | 123/196 R |
| 2006/0288976 A1 | * | 12/2006 | Watanabe ............... | 123/196 R |

FOREIGN PATENT DOCUMENTS

JP 07-127661 5/1995

* cited by examiner

*Primary Examiner*—Hai Huynh
(74) *Attorney, Agent, or Firm*—Alleman Hall McCoy Russell & Tuttle LLP

(57) ABSTRACT

An oil feeding system of an engine equipped with a transmission configured to change a rotational speed of rotation of a crankshaft and to output the rotation, including an oil pump configured to be driven in cooperation with the rotation of the crankshaft, an oil passage through which the oil outflowing from the oil pump flows, in which the oil passage includes a transmission oil passage through which the oil outflowing from the oil pump is guided to the transmission, and an engine body oil passage through which the oil outflowing from the oil pump is guided to portions other than the transmission, and an oil control portion configured to change a ratio between a pressure of the oil flowing through the transmission oil passage and a pressure of the oil flowing through the engine body oil passage.

4 Claims, 10 Drawing Sheets

OIL FEEDING SYSTEM OF ENGINE

TECHNICAL FIELD

The present invention generally relates to an oil feeding system of an engine configured to be integral with a transmission. More particularly, the present invention relates to an oil feeding system of an engine that is suitable for use with a motorcycle and is configured to feed oil to a transmission and components other than the transmission.

BACKGROUND ART

Some engines mounted in vehicles such as motorcycles or all terrain vehicles (ATVs) are integral with transmissions. In such engines, an oil pump is driven in synchronization with an engine speed of the engine to suction up oil from an interior of an oil pan mounted at a bottom portion of the engine or from an oil tank externally mounted to the engine, thus delivering the oil to the transmission and engine components.

To be specific, the oil outflows from the oil pump and is delivered, through an oil passage formed in an interior of the engine, to the transmission to lubricate and cool the transmission, and to a crankshaft and a camshaft to lubricate and cool these shafts. In recent years, some engines have been equipped with a hydraulically-powered variable valve timing system configured to change a rotational phase of a camshaft or a hydraulically-powered tensioner lifter. In such engines, the oil is fed to the hydraulically-powered system or component to drive them (see, e.g., Japanese Laid-Open Patent Application Publication No. Hei. 7-127661).

The engine typically runs in a wide speed range from a low engine speed to a high engine speed. In particular, the engine mounted in the motorcycle runs in a very wide speed range. Since the oil pump is driven in synchronization with the engine speed of the engine, oil pressure tends to become high when the engine is running at a high engine speed, and tends to become low when the engine is running at a low engine speed.

A relatively high oil pressure is sometimes required to drive some systems even when the engine is running at a low engine speed. However, it may sometimes be difficult to obtain such a high oil pressure with the engine running at a low engine speed. In order to solve this, a volume of the oil pump may be increased, which undesirably causes a substantial weight increase and a large friction loss in the engine.

SUMMARY OF THE INVENTION

The present invention addresses the above described conditions, and an object of the present invention is to provide an oil feeding system of an engine that is capable of suitably feeding oil to a transmission and portions other than the transmission in a wide engine speed range from a low engine speed to a high engine speed, and of obtaining, in a low engine speed range, an oil pressure required to suitably drive a hydraulically-powered system.

According to the present invention, there is provided an oil feeding system of an engine equipped with a transmission configured to change a rotational speed of rotation of a crankshaft and to output the rotation, comprising an oil pump configured to be driven in cooperation with the rotation of the crankshaft; an oil passage through which oil outflowing from the oil pump flows; wherein the oil passage includes a transmission oil passage through which the oil outflowing from the oil pump is guided to the transmission, and an engine body oil passage through which the oil outflowing from the oil pump is guided to portions other than the transmission; and an oil control portion configured to change a ratio between a pressure of the oil flowing through the transmission oil passage and a pressure of the oil flowing through the engine body oil passage.

With the above mentioned configuration, the ratio of the pressure between the oil delivered to the transmission and the oil delivered to the portions other than the transmission is able to be controlled according to an engine speed of the engine so that the oil is fed in suitable pressures to the transmission and the portions other than the transmission. In general, the pressure of the oil is substantially proportional to a flow rate of the oil. So, the oil control portion may be configured to change a ratio between the flow rate of the oil flowing in the transmission oil passage and the flow rate of the oil flowing in the engine body oil passage. Thus, the ratio of the flow rate between the oil delivered to the transmission and the oil delivered to the portions other than the transmission can be controlled so that the oil is fed in suitable amounts to the transmission and the portions other than the transmission.

The oil passage may further include a distributing passage from which the oil outflowing from the oil pump is distributed to the transmission oil passage and the engine body oil passage which are configured to branch from the distributing passage.

With the above mentioned configuration, in the oil feeding system in which the oil is delivered from the oil pump to the distributing passage, for example, a main gallery, and further through the transmission oil passage and the engine body oil passage that branch from the distributing passage, the oil is able to be fed to the transmission and the portions other than the transmission in suitable pressure and/or amount through the transmission oil passage and the engine body oil passage.

The oil control portion may be provided in the transmission oil passage, and may be configured to restrict a flow rate of the oil flowing in the transmission oil passage to increase the pressure of the oil delivered to the portions other than the transmission, when the pressure of the oil in the transmission oil passage is low.

With the above mentioned configuration, when the engine speed of the engine is high, a sufficient flow rate of the oil can be obtained. Therefore, the oil can be delivered in a sufficient amount to the transmission and a pressure of the oil required to drive the portions other than the transmission can be obtained. On the other hand, when the engine speed is low, the oil control portion reduces the flow rate of the oil in the transmission oil passage, and the pressure of the oil required to drive the portions other than the transmission can be obtained.

The oil control portion may be configured to restrict the flow rate of the oil in the transmission oil passage when the pressure of the oil in the transmission oil passage is a predetermined value or less. With such a configuration, when the engine speed is high and the pressure of the oil is higher than the predetermined value, the oil pressure required to drive the portions other than the transmission can be obtained, and the oil can be fed in a sufficient amount to the transmission through the transmission oil passage. On the other hand, when the engine speed is low and the pressure of the oil is the predetermined value or less, the oil control portion restricts (or reduces) the flow rate of the oil in the transmission oil passage so that the oil is fed in a required amount to the transmission and the oil pressure required to drive the portions other than the transmission can be obtained.

The transmission oil passage may include a first oil passage and a second oil passage which are connected in parallel. The oil control portion may include a valve that is provided in the second oil passage and is configured to restrict a flow rate of the oil in the second oil passage when the pressure of the oil is a predetermined value or less.

With the above mentioned configuration, when the engine is running at a low engine speed and the pressure of the oil is the predetermined value or less, the valve of the oil control portion provided in the second oil passage is closed. Thereby, the flow rate of the oil flowing in the transmission oil passage is restricted, and the oil pressure required to drive the portions other than the transmission can be obtained. On the other hand, when the engine is running at a high speed, and the pressure of the oil is higher than the predetermined value, the valve of the oil control portion is opened to allow the oil to be delivered in sufficient amount to the transmission through the first and second oil passages.

The first oil passage of the transmission oil passage may be partially provided with a restricting portion having a passage with a diameter smaller than a diameter of a region in the vicinity of the restricting portion. With such a configuration, with the engine running at a low engine speed, the flow rate of the oil flowing in the transmission oil passage can be restricted, and the pressure of the oil delivered to the portions other than the transmission can be increased.

The oil pump may include a first oil pump and a second oil pump. The oil outflowing from the first oil pump may be guided to the transmission through the transmission oil passage, and the oil outflowing from the second oil pump may be guided to the portions other than the transmission through the engine body oil passage.

With the above mentioned configuration, in the oil feeding system in which the oil outflowing from the first oil pump is delivered through the transmission oil passage and the oil outflowing from the second oil pump is delivered through the engine body oil passage, the oil can be fed in a sufficient pressure and/or amount to the transmission and the portions other than the transmission through the transmission oil passage and the engine body oil passage.

The oil control portion may include a bypass passage through which the transmission oil passage is connected to the engine body oil passage, and a valve configured to restrict a flow of the oil in the bypass passage. The valve may be configured to increase a flow rate of the oil in the bypass passage flowing from the engine body oil passage to the transmission oil passage, when the pressure of the oil in the engine body oil passage is a predetermined value or more.

With the above mentioned configuration, the first oil pump, which is adapted to suitably feed the oil to the transmission, and the second oil pump, which is adapted to suitably feed the oil to the portions other than the transmission, can be used together. By using the second oil pump, the required oil pressure can be obtained with the engine running at a low engine speed. If the engine equipped with the second oil pump runs at a high engine speed, the pressure of the oil flowing in the engine body oil passage tends to become high up to an undesired level, and the oil tends to be delivered in excess amount. When the pressure of the oil becomes a predetermined value, the valve is opened, causing a surplus of the oil in the engine body oil passage to flow into the transmission oil passage through the bypass passage to be fed to the transmission. Because of the second oil pump, the volume of the first oil pump can be made small.

The oil feeding system may further comprise at least one of a hydraulically-powered variable valve timing system and a hydraulically-powered tensioner lifter, the variable valve timing system being configured to be driven by the pressure of the oil to change a rotational phase of a camshaft, the tensioner lifter being configured to be driven by the pressure of the oil to guide a cam chain installed around the camshaft and a crankshaft. At least one of the hydraulically-powered variable valve timing system and the hydraulically-powered tensioner lifter may be configured to be driven by the pressure of the oil delivered through the engine body oil passage.

With the above mentioned configuration, the hydraulically-powered variable valve timing system and/or the hydraulically-powered tensioner lifter can be suitably operated in a wide engine speed range from a low engine speed to a high engine speed.

The above and further objects and features of the invention will more fully be apparent from the following detailed description with accompanying drawings.

DETAILED DESCRIPTION OF THE PREFERRED EMBODIMENTS

Figure 1:
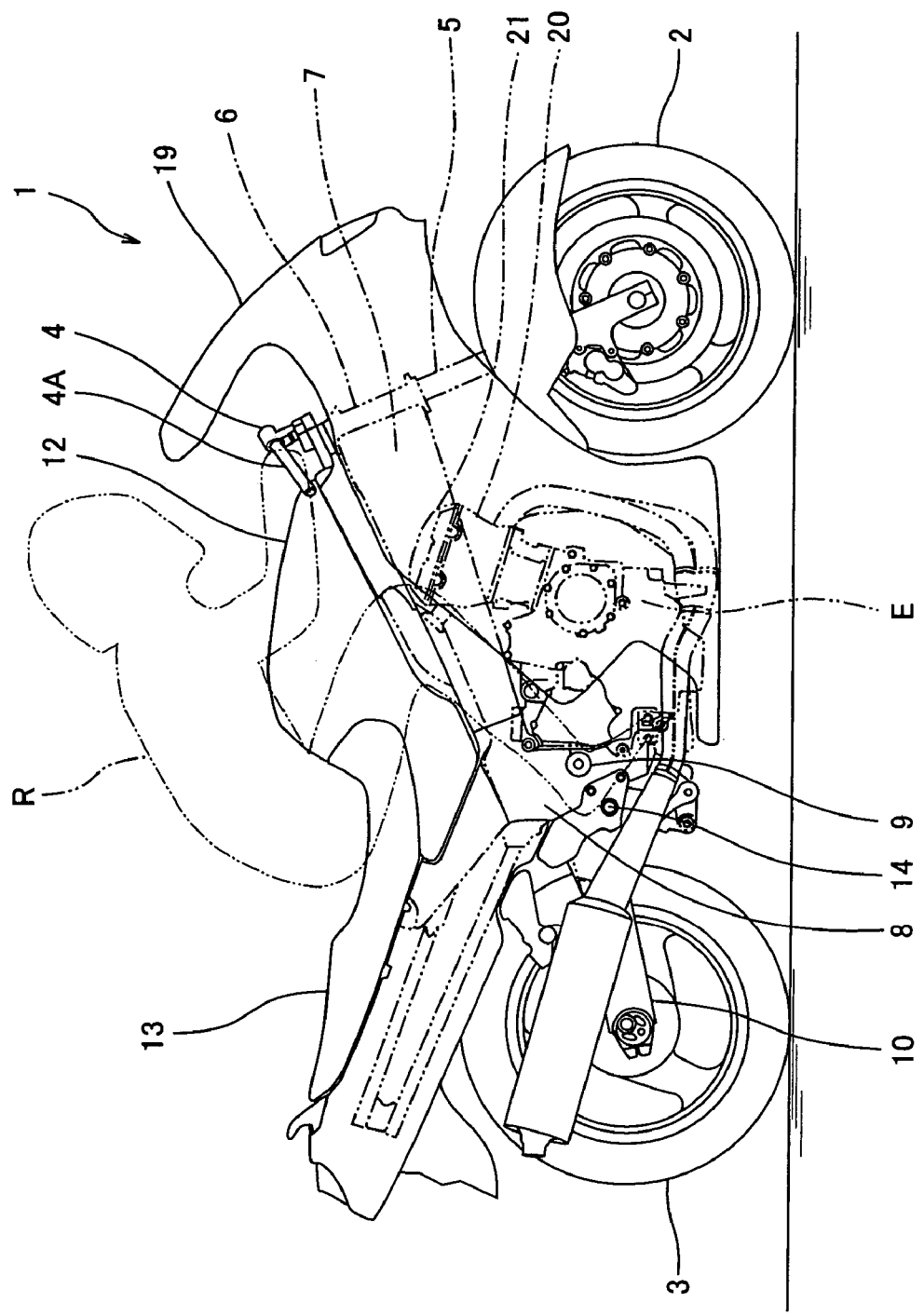
FIG. 1 is a right side view of a motorcycle in which an engine according to an embodiment of the present invention is mounted.

Hereinafter, an embodiment of an oil feeding system of an engine of the present invention will be described with reference to the accompanying drawings. FIG. 1 is a right side view of a motorcycle 1 in which an engine E according to an embodiment of the present invention is mounted. The motorcycle 1 is a road sport type motorcycle in which a rider R rides with an upper body leaning forward. Herein, directions are generally referenced from the perspective of the rider R mounting the motorcycle 1 of FIG. 1.

Turning now to FIG. 1, the motorcycle 1 includes a front wheel 2 and a rear wheel 3. The front wheel 2 is rotatably mounted to a lower region of a front fork 5 extending substantially vertically. A bar-type steering handle 4 is attached to an upper region of the front fork 5. The front fork 5 is mounted to a steering shaft (not shown) extending in parallel with the front fork 5. The steering shaft is rotatably supported by a head pipe 6. When the rider R rotates the steering handle 4 clockwise or counterclockwise, the front wheel 2 is turned to a desired direction.

A pair of right and left main frames 7 (only right main frame 7 is illustrated in FIG. 1), forming a frame of the vehicle body, extend rearward from the head pipe 6. Pivot frames (swing arm brackets) 8 extend downward from rear regions of the main frames 7. A swing arm 10 is pivotally mounted at a front end portion thereof to a pivot 9 attached on the pivot frame 8. The rear wheel 3 is rotatably mounted to a rear end portion of the swing arm 10.

A fuel tank 12 is disposed above the main frames 7 and behind the steering handle 4. A straddle-type seat 13 is disposed behind the fuel tank 12. An engine E is mounted between and under the right and left main frames 7. The engine E is an inline four-cylinder four-cycle engine, and is a double overhead camshaft (DOHC) engine (see FIG. 2), including, in an interior of the cylinder head 20, a camshaft 30 configured to drive an intake valve and a camshaft 31 configured to drive an exhaust valve. An output of the engine E is transmitted, through a chain (not shown), to the rear wheel 3, which rotates to generate a driving force to drive the motorcycle 1. A cowling 19 is mounted to cover a front region of the motorcycle 1, i.e., front regions of the head pipe 6 and the main frames 7, and side regions of the engine E. Mounting the seat 13, the rider R grips a grip 4A attached at an end portion of the steering handle 4 and puts feet on foot rests provided in the vicinity of a rear region of the engine E. Under this condition, the rider is ready to start-up the motorcycle 1.

Figure 2:
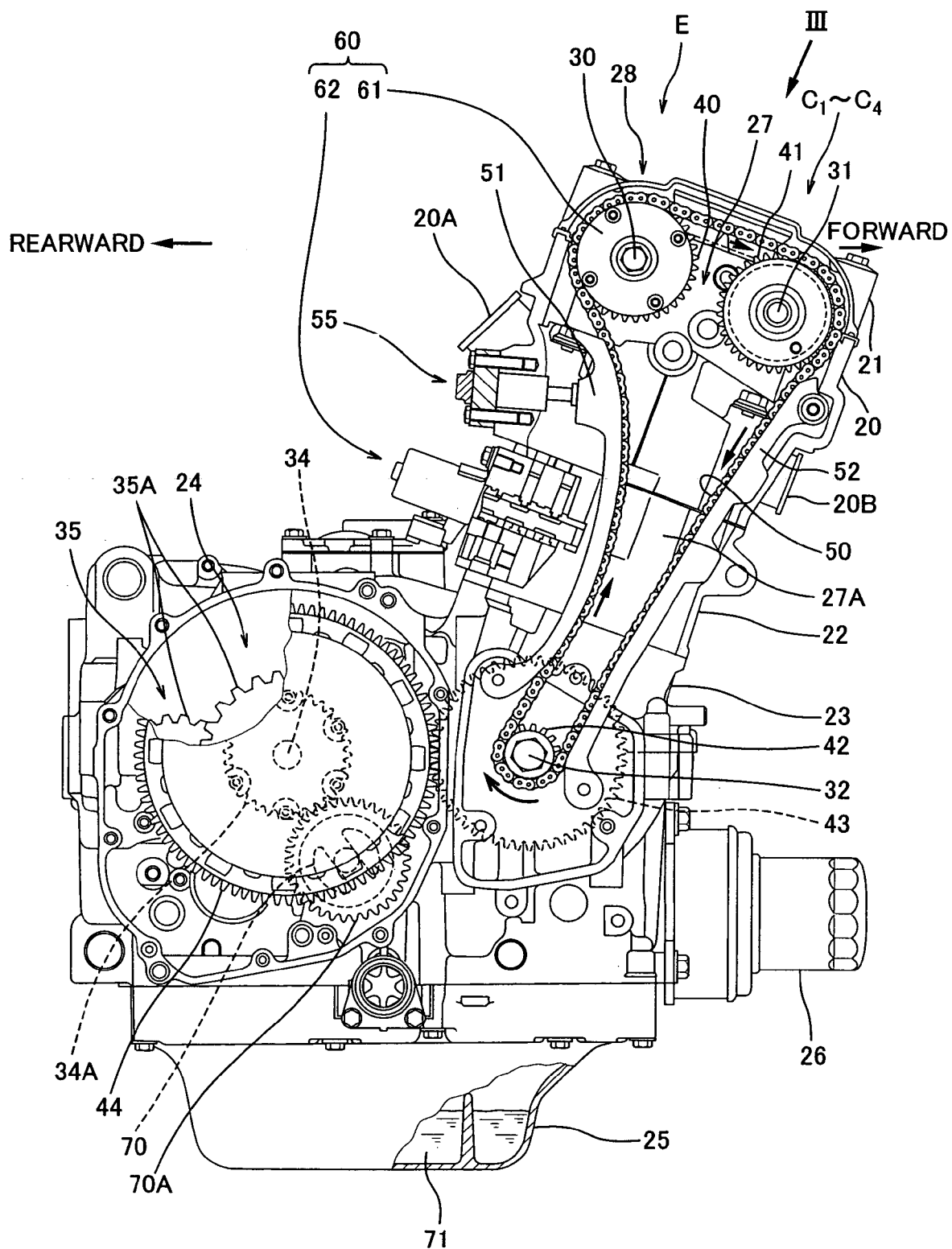
FIG. 2 is an enlarged right side view of the engine of FIG. 1, showing a structure of an interior of a chain tunnel provided on a right side of the engine.
Figure 3:
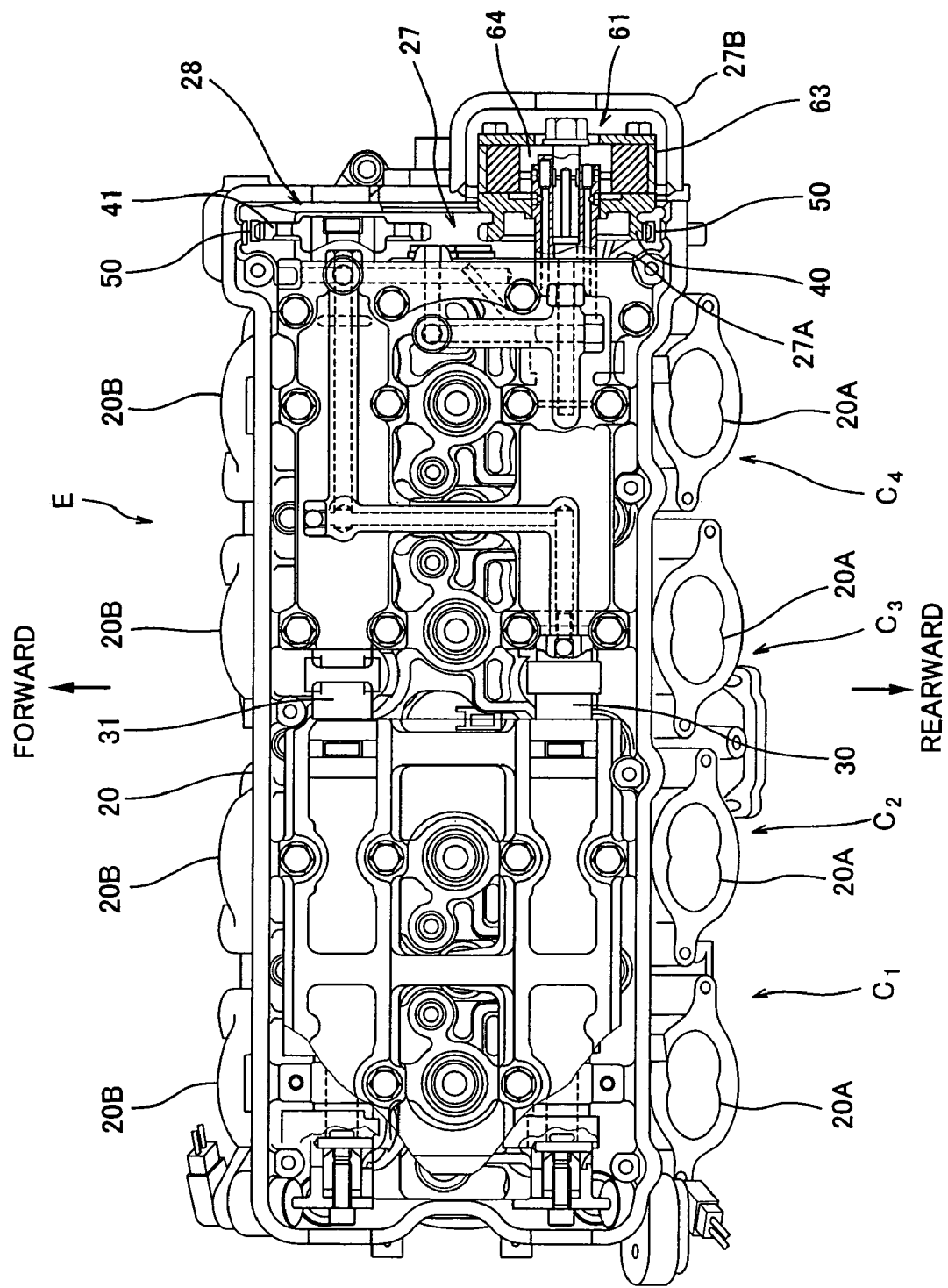
FIG. 3 is a plan view of the engine, taken in the direction of arrow III of FIG. 2, showing a structure of an upper portion of a cylinder head with a cylinder head cover removed.

FIG. 2 is an enlarged right side view of the engine E of FIG. 1, showing a structure of an interior of a chain tunnel 27 provided on a right side of the engine E. FIG. 3 is a plan view of the engine E, taken in the direction of arrow III of FIG. 2, showing a structure of an upper portion of the cylinder head 20 with a cylinder head cover 21 removed.

As shown in FIG. 3, the engine E includes four cylinders C1 to C4. As shown in FIG. 2, these cylinders C1 to C4 are inclined forward with a predetermined angle. As shown in FIG. 3, four air-intake ports 20A are provided at a rear portion of the cylinder head 20 so as to respectively correspond to the four cylinders C1 to C4. The four air-intake ports 20A are configured to open upward and rearward. Four exhaust ports 20B are provided at a front portion of the cylinder head 20 and are configured to open forward.

As shown in FIG. 2, the camshaft 30 and the camshaft 31 are mounted at an upper region of the cylinder head 20, and a cam holder (not shown) is provided over the camshafts 30 and 31 from above. The cylinder head cover 21 is provided over the cam holder and is fixed to the cylinder head 20. In this state, the camshaft 30 and the camshaft 31 are rotatably retained between the upper portion of the cylinder head 20 and a lower portion of the cam holder.

A cylinder block 22 is coupled to a lower portion of the cylinder head 20 and is configured to house a piston (not shown). A crankcase 23 is coupled to a lower portion of the cylinder block 22 and is configured to accommodate a crankshaft 32 that is mounted to extend in a width direction of the vehicle body. A chain tunnel outer wall portion 27B (its cross-sectional structure is illustrated in FIG. 3) that is recessed rightward is coupled at a periphery thereof to a right wall portion, namely, chain tunnel inner wall portion 27A of the cylinder head 20, the cylinder head cover 21, the cylinder block 22, and the crankcase 23 to cover the chain tunnel inner wall portion 27A. An inner space defined by the chain tunnel inner wall portion 27A and the chain tunnel outer wall portion 27B forms the chain tunnel 27 configured to accommodate a camshaft drive system 28. An oil pan 25 is mounted to a lower portion of the crankcase 23 and is configured to store lubricating oil. An oil filter 26 protrudes from a front portion of the crankcase 23 and is configured to filter oil suctioned up from the oil pan 25.

As shown in FIG. 2, the camshaft drive system 28 mounted in the interior of the cam chain tunnel 27 includes an intake cam sprocket 40, an exhaust cam sprocket 41, and a crank sprocket 42. To be specific, as shown in FIG. 3, a right end portion of the camshaft 30 protrudes from the chain tunnel inner wall portion 27A into the interior of the chain tunnel 27. The intake cam sprocket 40 is mounted on the right end portion of the camshaft 30. A right end portion of the camshaft 31 protrudes from the chain tunnel inner wall portion 27A into the interior of the chain tunnel 27. The exhaust cam sprocket 41 is mounted on the right end portion of the camshaft 31, and is configured to rotate integrally with the camshaft 31. As shown in FIG. 2, a right end portion of the crankshaft 32 protrudes from the chain tunnel inner wall portion 27A into the interior of the chain tunnel 27. The crank sprocket 42 is mounted on the right end portion of the crankshaft 32 and is configured to rotate integrally with the crankshaft 32.

A timing chain 50 is installed around the intake cam sprocket 40, the exhaust cam sprocket 41, and the crank sprocket 42. The intake cam sprocket 40 and the exhaust cam sprocket 41 are configured to rotate in cooperation with the rotation of the crank sprocket 42. Through the camshaft drive system 28 including the intake cam sprocket 40, the exhaust cam sprocket 41, the crank sprocket 42, and the timing chain 50, the rotation of the crankshaft 32 is transmitted to the camshaft 30 and the camshaft 31. In the engine E of this embodiment, the crankshaft 32 rotates clockwise in FIG. 2, and the timing chain 50, the intake cam sprocket 40, and the exhaust cam sprocket 41 also rotate clockwise.

As shown in FIG. 2, the engine E is equipped with a hydraulically-powered variable valve timing system 60 including a hydraulically-powered actuator 61 and an oil control valve 62. The hydraulically-powered actuator 61 is mounted to a right end portion of the camshaft 30 and to an outer portion of the intake cam sprocket 40 (see FIG. 3). The oil control valve 62 is mounted to a rear wall portion of the cylinder block 22. The oil control valve 62 may alternatively be mounted to other portions, for example, a wall portion of the cylinder head 20. In this case, the oil control valve 62 may be disposed horizontally laterally of a movable chain tensioner 51 mentioned later. The oil control valve 62 may alternatively be mounted to a side wall portion or a front wall portion of the cylinder head 20 or otherwise may be mounted to the cylinder head cover 21.

As shown in FIG. 3, the hydraulically-powered actuator 61 includes a tubular housing 63 that has a bottom portion and is configured to rotate integrally with the intake cam sprocket 40, and a rotor 64 that is accommodated in the housing 63 and is configured to rotate integrally with the camshaft 30. The hydraulically-powered actuator 61 contains, in an interior of the housing 63, a plurality of advanced angle (or phase) spaces and retarded angle (or phase) spaces (not shown) that are defined by the housing 63 and the rotor 64. The hydraulically-powered actuator 61 is coupled to the oil control valve 62 through an oil passage 80, i.e., an eighth oil passage 88 (see FIG. 4) as mentioned later. The oil is delivered to the advanced angle spaces and the retarded angle spaces through the oil passage 80, i.e., the eighth oil passage 88, and a phase difference between the housing 63 and the rotor 64 changes according to a flow rate or an oil pressure of the delivered oil.

In the engine E constructed above, the rotation of the crankshaft 32 is transmitted, through the timing chain 50, to the intake cam sprocket 40 and the exhaust cam sprocket 41, which thereby rotate. The camshaft 31 rotates according to the rotation of the exhaust cam sprocket 41 in such a manner that the camshaft 31 rotates once with respect to two rotations of the crankshaft 32. The rotation of the intake cam sprocket 40 is transmitted to the camshaft 30 through the hydraulically-powered actuator 61 of the variable valve timing system 60. According to the flow rate or oil pressure controlled by the oil control valve 62, the camshaft 30 rotates with a predetermined phase difference (or angle) with respect to the rotation of the crankshaft 32. The phase difference between the crankshaft 32 and the camshaft 30 changes according to the flow rate or the oil pressure changed by the oil control valve 62.

As shown in FIG. 2, the movable chain tensioner 51 and a fixed chain guide 52 are mounted in the interior of the chain tunnel 27. The movable chain tensioner 51 is disposed behind the timing chain 50 to extend substantially vertically. The movable chain tensioner 51 is mounted in such a manner that a lower end portion thereof is pivoted to a right wall portion of the crankcase 23 in the vicinity of a region above the crank sprocket 42, and an upper end portion thereof is located in the vicinity of a region below the intake cam sprocket 40. A hydraulically-powered tensioner lifter 55 is mounted to a rear wall portion of the cylinder head 20 and is configured to apply a forward force to an upper portion of the chain tensioner 51 to enable the timing chain 50 to be supported from behind and to have a suitable tension.

The fixed chain guide 52 mounted in the interior of the chain tunnel 27 extends substantially vertically in front of the timing chain 50 from a location near and forward of the crank sprocket 42 to a location near and under the exhaust cam sprocket 41. The chain guide 52 is provided with a groove (not shown) formed at a rear region thereof to extend in a longitudinal direction to allow the timing chain 50 to be supported from forward. To be specific, a front region of the timing chain 50 is accommodated in the groove formed at the rear region of the fixed chain guide 52 so that the timing chain 50 is movable along the groove.

An output gear 43 is mounted on a right side portion of the crankshaft 32 in the interior of the crankcase 23 and is configured to rotate integrally with the crankshaft 32. Through the output gear 43, the rotation of the crankshaft 32 is output. A transmission space 24 is formed at a rear portion of the crankcase 23. A main shaft 34 and a counter shaft (not shown) are accommodated in the transmission space 24 to extend in parallel with the crankshaft 32. A plurality of gears 35A are mounted on the main shaft 34 and the counter shaft, thereby forming the transmission 35. An input gear 44 is mounted on a right end portion of the main shaft 34, and is configured to mesh with the output gear 43 of the crankshaft 32 and to rotate integrally with the main shaft 34. In this construction, the output of the engine E is transmitted from the crankshaft 32 to the main shaft 34 through the output gear 43 and the input gear 44. Further, the transmission 35 changes a rotational speed of the rotation, and the resulting rotation is output to the rear wheel 3 (FIG. 1).

The above mentioned engine E includes an oil pump 70. The oil pump 70 is provided with a pump driven gear 70A adapted to mesh with a pump drive gear 34A mounted on the main shaft 34 of the transmission 35. The oil pump 70 is driven according to the rotation of the crankshaft 32. The engine E is provided with an oil passage 80 (see FIG. 4) through which oil 71 suctioned up by the oil pump 70 from the oil pan 25 is delivered to the transmission 35 and the engine components.

Figure 4:
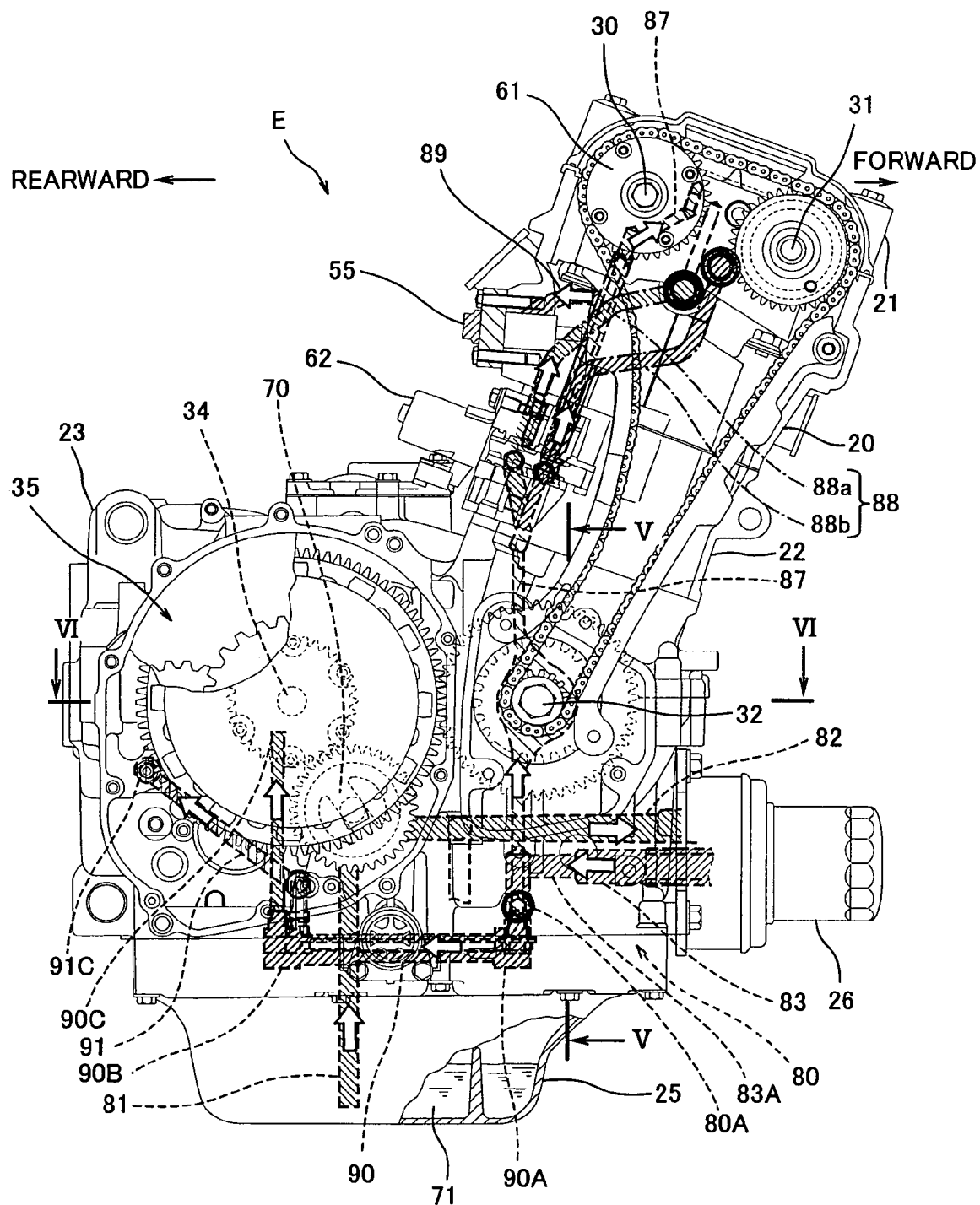
FIG. 4 is a side view showing a structure of oil passages included in an oil feeding system of the engine of FIG. 2.
Figure 5:
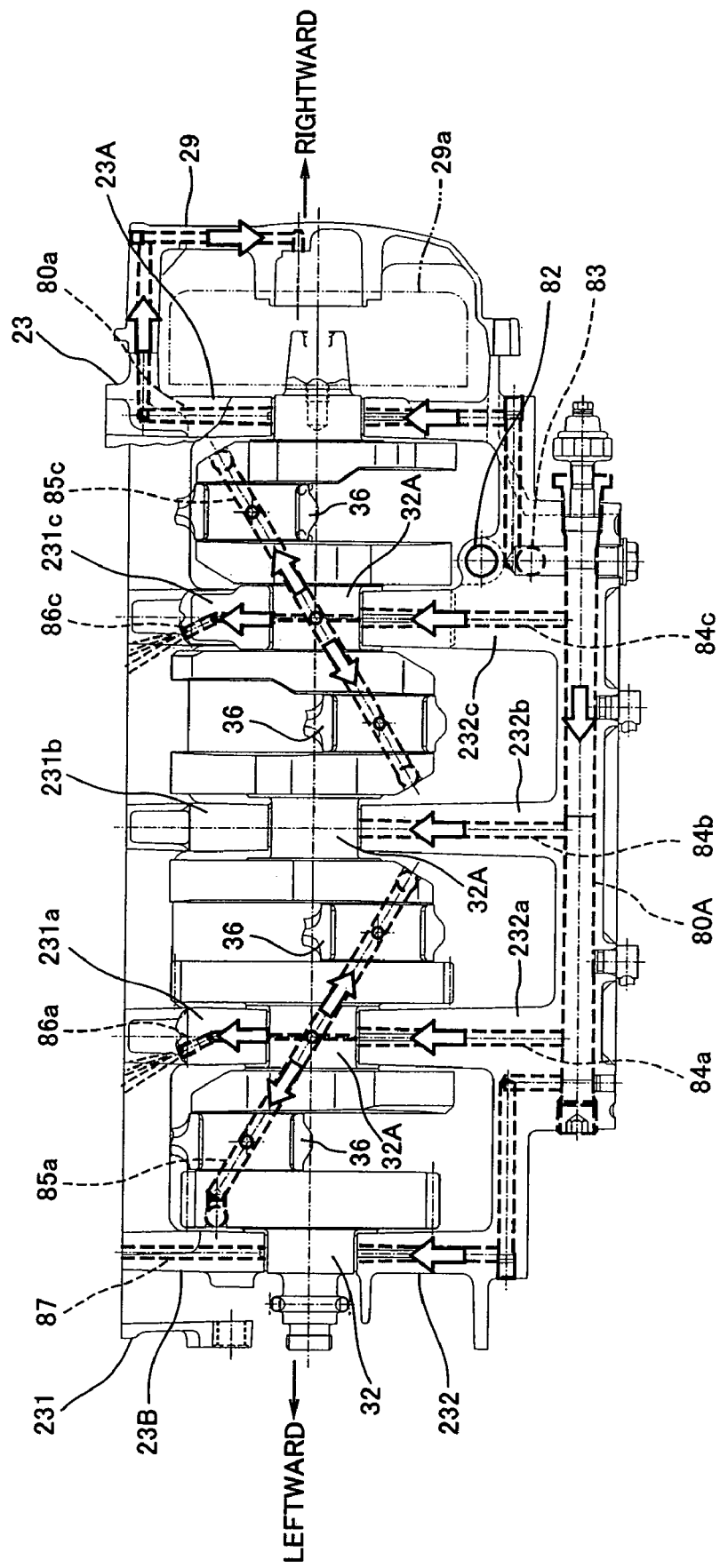
FIG. 5 is a cross-sectional view of the engine, taken substantially along line V-V of FIG. 4.
Figure 6:
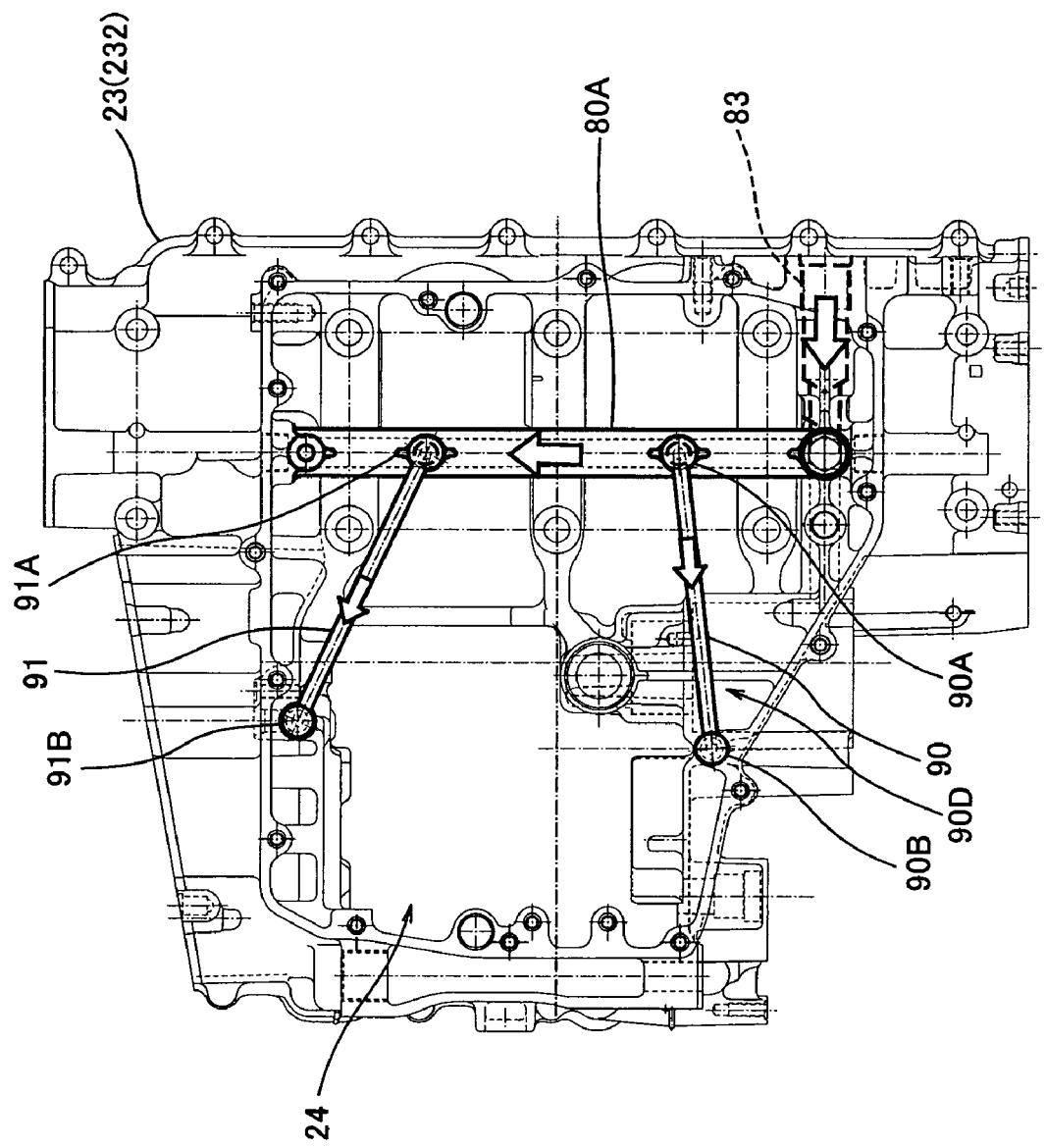
FIG. 6 is a cross-sectional view of the engine, taken substantially along line VI-VI of FIG. 4, showing a structure of the oil passages.
Figure 7:
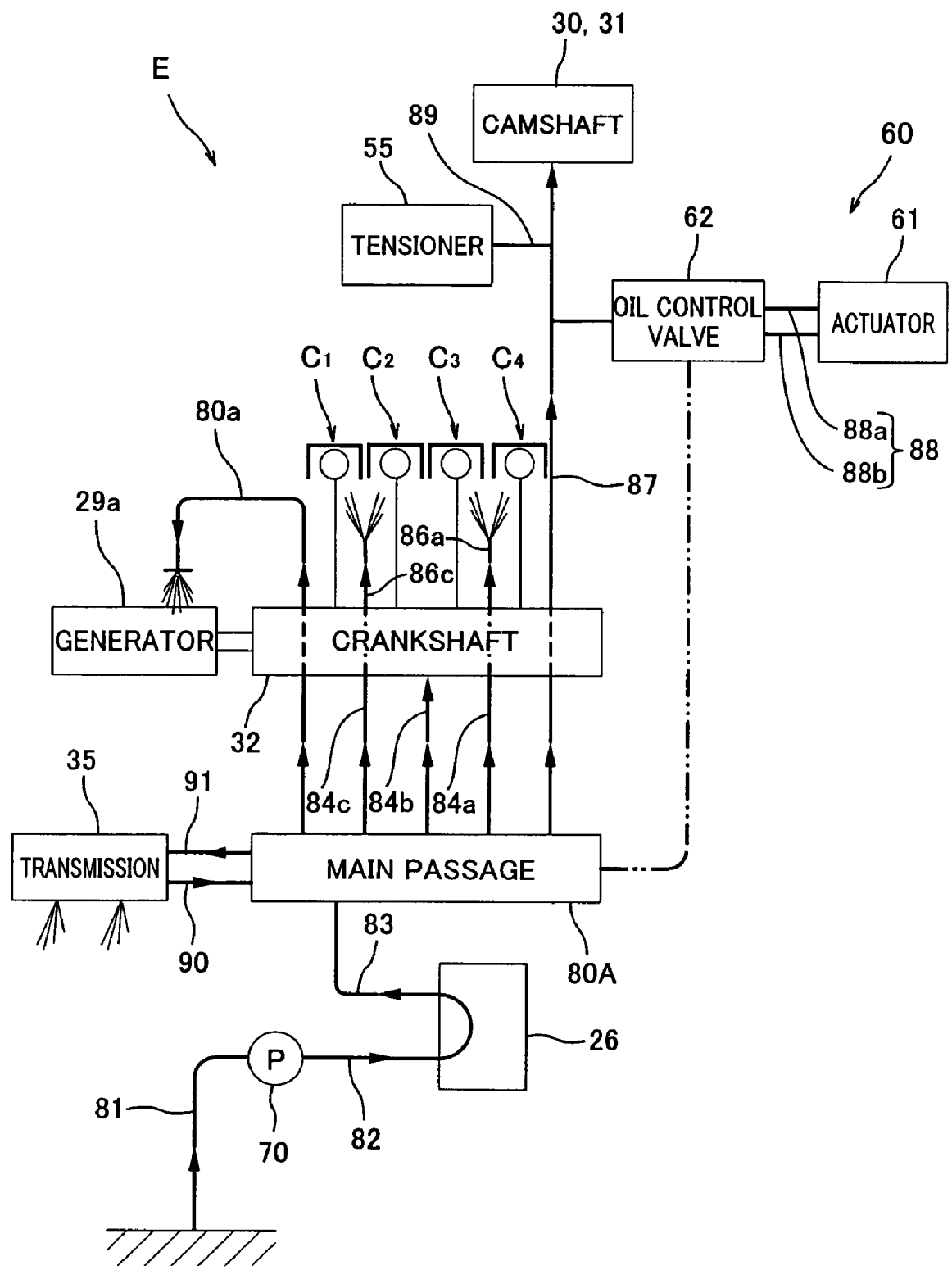
FIG. 7 is a schematic view of the oil passages illustrated in FIGS. 4 to 6.

With reference to FIGS. 4 to 7, the oil passage 80 included in the oil feeding system of the engine E will be described. FIG. 4 is a side view showing the structure of the oil passage 80 in the engine E of FIG. 2. FIG. 5 is a cross-sectional view of the engine E, taken substantially along line V-V of FIG. 4, showing a vertical section of the crankcase 23 and its internal structure. FIG. 6 is a cross-sectional view of the engine E, taken substantially along line VI-VI of FIG. 4, showing a horizontal section of an internal structure of the crankcase 23. FIG. 7 is a schematic view of the oil passage 80 illustrated in FIGS. 4 to 6.

As shown in FIG. 4, a first oil passage 81 extends upward from the oil pan 25 to an inlet of the oil pump 70. An oil strainer (not shown) is mounted to a lower end portion of the first oil passage 81. A second oil passage 82 extends forward from an outlet of the oil pump 70 to an inlet of the oil filter 26 located at a front portion of the engine E. A third oil passage 83 extends rearward from an outlet of the oil filter 26 to a location under the crankshaft 32 and is coupled at a tip end 83A to a main passage (distributing passage) 80A with a larger diameter. The oil pump 70 is driven to suction up the oil from the interior of the oil pan 25 through the first oil passage 81. The oil is delivered to the oil filter 26 through the second oil passage 82. The oil filter 26 filters the oil, and the resulting oil is delivered to the main passage 80A through the third oil passage 83.

As shown in FIGS. 5 and 6, the main passage 80A extends in a rightward and leftward direction at a lower portion of the crankcase 23. As mentioned later, a plurality of oil passages extend from the main passage 80A, including a transmission oil passage extending to the transmission 35 and an engine body oil passage extending to the portions other than the transmission 35. Below, the engine body oil passage will be first described and then the transmission oil passage will be described.

As shown in FIG. 5, the crankcase 23 of the engine E includes an upper crankcase 231 and a lower crankcase 232 with respect to an axis of the crankshaft 32. The upper crankcase 231 and the lower crankcase 232 are coupled to each other. Bulkheads 231*a* to 231*c* and bulkheads 232*a* to 232*c* protrude from the upper crankcase 231 and the lower crankcase 232, respectively, in such a manner that the bulkheads 231*a* to 231*c* correspond to the bulkheads 232*a* to 232*c*, respectively. The crankshaft 32 is rotatably mounted to the crankcase 23 in such a manner that crank journals 32A are retained from above and below, between the bulkheads 231*a* and 232*a*, between the bulkheads 231*b* and 232*b*, and between the bulkheads 231*c* and 232*c*.

As shown in FIG. 5, fourth oil passages 84*a* to 84*c* included in the engine body oil passage extend upward from the main passage 80A through the interiors of the bulkheads 232*a* to 232*c* of the lower crankcase 232. Through the fourth oil passages 84*a* to 84*c* extending upward in the interior of the bulkheads 232*a* to 232*c*, the oil is fed from the main passage 80A to contact portions between the crank journals 32A and the bulkheads 231*a* to 231*c* and 232*a* to 232*c* to lubricate the contact portions.

The crankshaft 32 is provided with fifth oil passages 85*a* and 85*c* included in the engine body oil passage and connected to the left fourth oil passage 84*a* and the right fourth oil passage 84*c*, respectively. Through the fifth oil passages 85*a* and 85*c*, a part of the oil flowing from the fourth oil passages 84*a* and 84*c* is fed to contact portions between the crankshaft 32 and connecting rods 36 to lubricate the contact portions and may be sometimes fed to a balancer shaft (not shown) of the engine E. The left bulkhead 231*a* and the right bulkhead 231*c* of the upper crankcase 231 are provided with sixth oil passages 86*a* and 86*c* included in the engine body oil passage, which are connected to the fourth oil passages 84*a* and 84*c* formed in the left bulkhead 232*a* and the right bulkhead 232*c* of the lower crankcase 232, respectively. The sixth oil passages 86*a* and 86*c* open at upper regions of the bulkheads 231*a* and 231*c*. Apart of the oil flowing from the fourth oil passages 84*a* and 84*c* is injected toward back surfaces of pistons (not shown) through the openings of the sixth oil passages 86*a* and 86*c*. Oil passages through which the oil is injected toward the back surfaces of the pistons are not intended to the sixth oil passages 86*a* and 86*c*, but may be provided at the center bulkhead 231*b* as necessary, or otherwise four oil passages may be provided to correspond to the respective of the four pistons.

As shown in FIG. 5, a generator oil passage 80*a* included in the engine body oil passage extends from a right end portion of the main passage 80A and through an interior of the right wall portion 23A of the crankcase 23. The generator oil passage 80*a* extends upward in the interior of the right wall portion 23A of the crankcase 23, within a wall portion of a generator cover 29, and to a generator 29*a* accommodated in an interior of the generator cover 29. Through the generator oil passage 80*a*, a part of the oil is fed from the main passage 80A to the generator 29*a* to cool the generator 29*a*.

A seventh oil passage 87 included in the engine body oil passage extends from a left end portion of the main passage 80A and through an interior of the left wall portion 23B of the crankcase 23. As shown in FIG. 4, the seventh oil passage 87 extends upward in an interior of the left wall portion 23B of the crankcase 23, through the wall portions of the cylinder block 22 and the cylinder head 20, and to the upper region of the cylinder head 20. The oil is fed to the camshaft 30 and the camshaft 31 through the seventh oil passage 87 to lubricate the camshafts 30 and 31.

As shown in FIG. 4, an eighth oil passage 88 included in the engine body oil passage extends from a region of the seventh oil passage 87 which corresponds to the cylinder block 22. The eighth oil passage 88 includes two sub-oil passages 88*a* and 88*b*. The sub-oil passage 88*a* is coupled to the advanced angle space (not shown) of the hydraulically-powered actuator 61 through the oil control valve 62. The sub-oil passage 88*b* is coupled to the retarded angle space (not shown) of the hydraulically-powered actuator 61 through the oil control valve 62. The oil is delivered to the oil control valve 62 through the sub-oil passages 88*a* and 88*b* of the eighth oil passage 88. The oil control valve 62 suitably controls a flow rate and an oil pressure of the oil, and the resulting oil is delivered through the sub-oil passages 88*a* and 88*b*, to the advanced angle space and the retarded angle space to drive the hydraulically-powered actuator 61.

A ninth oil passage 89 included in the engine body oil passage extends from a region of the seventh oil passage 87 which corresponds to the cylinder head 20. The ninth oil passage 89 is coupled to the hydraulically-powered tensioner lifter 55. The oil is fed to the hydraulically-powered tensioner lifter 55 through the ninth oil passage 89 to drive the tensioner lifter 55.

As shown in FIG. 6, a tenth oil passage 90 and an eleventh oil passage 91 included in the transmission oil passage extend rearward from locations of the main passage 80A. As shown in FIG. 6, the tenth oil passage 90 is coupled at an upstream end portion 90A to the main passage 80A, and then extends rearward to form an intermediate portion 90B located under the transmission 35. Further, as shown in FIG. 4, the tenth oil passage 90 extends upward to form a downstream end portion 90C located near the main shaft 34. As shown in FIG. 6, the eleventh oil passage 91 is coupled at an upstream end portion 91A to the main passage 80A, and then extends rearward to form an intermediate portion 91B located under the transmission 35. Further, the eleventh oil passage 91 extends upward and rearward to form a downstream end portion 91C (see FIG. 4) located near the countershaft (not shown). The oil is fed to the transmission 35 including the main shaft 34, the countershaft, etc, through the tenth oil passage 90 and the eleventh oil passage 91, to lubricate them (see FIG. 4).

Figure 8:
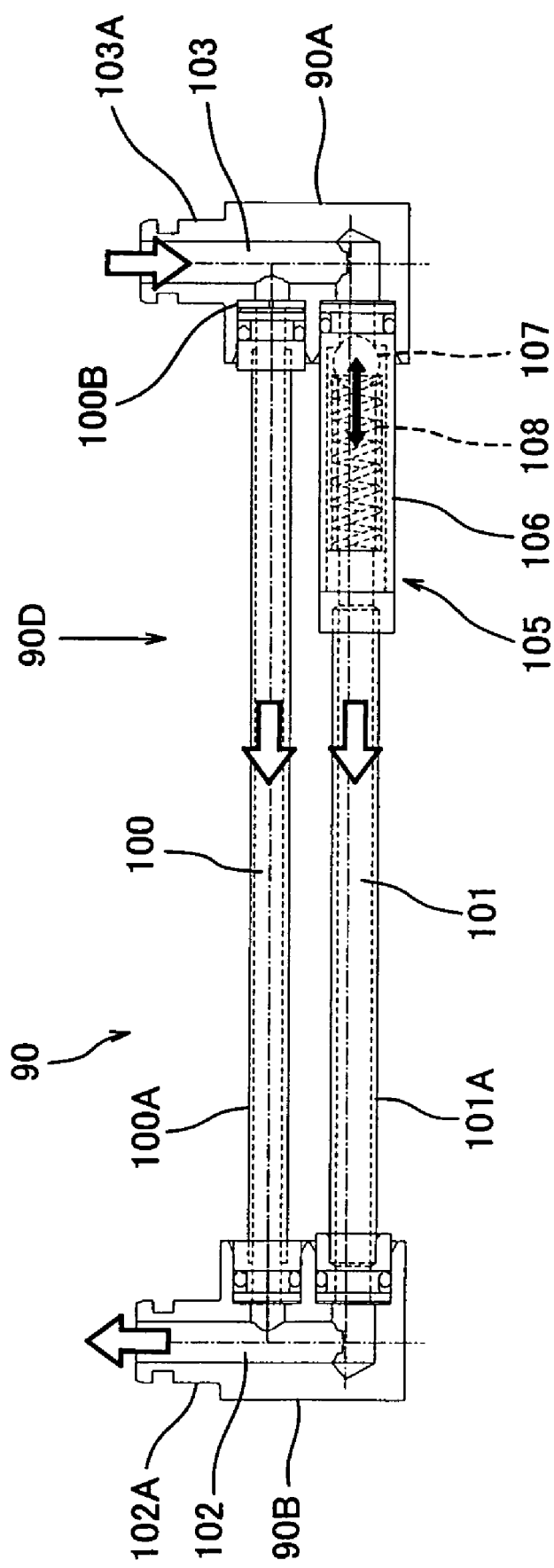
FIG. 8 is an enlarged side view showing a structure of a part of a tenth oil passage including an oil control portion, between an upstream end portion and an intermediate portion in a flow of the oil.

FIG. 8 is an enlarged side view of a structure of a part of the tenth oil passage 90, showing an oil control portion 90D provided between the upstream end portion 90A and the intermediate portion 90B. As shown in FIG. 8, the oil control portion 90D includes a main oil passage 100 and a sub-oil passage 101 arranged in a vertical direction so as to extend in parallel with each other. The main oil passage 100 and the sub-oil passage 101 are formed of a pipe member 100A and a pipe member 101A of a substantially equal length. The sub-oil passage 101 formed of the pipe member 101A has a diameter slightly larger than that of the main oil passage 100. A joint 102A located on an upstream side and a joint 103A located on a downstream side, which have internal passages 102 and 103, respectively, are coupled to both end portions of the pipe members 100A and 101A. The main oil passage 100 and the sub-oil passage 101 are connected to the internal passages 102 and 103. As shown in FIG. 4, the joint 103A on the upstream side is connected to the main passage 80A (see FIG. 4) and the joint 102A on the downstream side is connected to the downstream end portion 90C (see FIG. 4) of the tenth oil passage 90.

A restricting portion 100B is provided at an upstream end of the main oil passage 100. The restricting portion 100B is formed to have an inner diameter smaller than a passage diameter of a region of the main oil passage 100 which is in the vicinity of the restricting portion 100B. This makes it possible to suppress a pressure decrease in the oil 71 in the interior of the main passage 80A when the engine speed of the engine E is low.

A relief valve 105 is provided between an upstream end of the sub-oil passage 101 and the joint 103A. The relief valve 105 contains, in an interior of a tubular housing 106, a ball 107 having a diameter smaller than an inner diameter of the housing 106, and a coil spring 108 configured to apply a force to the ball 107 in an opposite direction to a flow direction of the oil in the housing 106. With the ball 107 in a predetermined position near the upstream end portion 90A of the housing 106 because an oil pressure on an upstream side of the ball 107 is not higher than a predetermined value, the relief valve 105 is closed so as not to permit flow of the oil in the sub-oil passage 101. On the other hand, with the ball 107 located to be away in the flow direction of the oil from the predetermined position near the upstream end portion 90A of the housing 106 because the oil pressure on the upstream side of the ball 107 is higher than the predetermined value, the relief valve 105 is opened, permitting the oil to flow in the sub-oil passage 101. Since the eleventh oil passage 91 has a structure similar to that of the tenth oil passage 90, it will not be further described.

In the engine E constructed above, when the crankshaft 32 rotates, the oil pump 70 suctions up the oil 71 from the oil pan 25. The oil pump 70 causes the oil 71 to be delivered to the main passage 80A through the oil filter 26, and further to engine components of the engine E. To be specific, the oil 71 is delivered from the main passage 80A to an upper region of the engine E to lubricate the crankshaft 32. In addition, the oil 71 is fed to the camshafts 30 and 31 to lubricate them. In addition, the oil 71 is delivered to the oil control valve 62 so as to be controlled to have a suitable oil pressure, and then is fed to the hydraulically-powered actuator 61 to enable the actuator 61 to determine a rotational phase of the camshaft 30. In addition, the oil 71 is fed to the hydraulically-powered tensioner lifter 55 to enable the tensioner lifter 55 to apply a force to the movable chain tensioner 51. Furthermore, the oil 71 is delivered from the main passage 80A to a rear region of the engine E, for example, the transmission 35, etc., through the tenth oil passage 90 and the eleventh oil passage 91 to lubricate them.

The oil passage 80, in particular, the eighth oil passage 88 and the ninth oil passage 89 may be formed in the interior of the wall portion of the engine E or otherwise may be a pipe member externally attached to the wall portion of the engine E.

Because the oil pump 70 is driven in cooperation with the rotation of the crankshaft 32, the pressure of the oil 71 in the interior of the oil passage 80 is relatively low when the rotational speed of the crankshaft 32 is low, and increases with an increase in the rotational speed of the crankshaft 32. So, when the rotational speed of the crankshaft 32 is low, the pressure of the oil 71 in the sub-oil passage 101 in the oil control portion 90D of the tenth oil passage 90 is low, and the relief valve 105 provided in the sub-oil passage 101 is closed. In this state, the oil 71 is fed to the transmission 35 only through the main oil passage 100. Since the oil 71 flows only through the main oil passage 100 in the tenth oil passage 90, the pressure of the oil 71 in the engine body oil passage of the oil passage 80 is maintained at a predetermined value or more so that the oil 71 is fed in sufficient pressure or amount to the camshaft 30, the camshaft 31, the hydraulically-powered actuator 61 of the variable valve timing system 60, and the hydraulically-powered tensioner lifter 55, which are positioned in the upper region of the engine E.

The pressure of the oil 71 increases with an increase in the rotational speed of the crankshaft 32. When the pressure of the oil 71 becomes a predetermined value or more, the relief valve 105 provided in the sub-oil passage 101 is opened, in the oil control portion 90D of the tenth oil passage 90. As a result, the oil 71 is fed, through the main oil passage 100 and the sub-oil passage 101 in the tenth oil passage 90, to the transmission 35 in sufficient pressure and/or amount required for high-speed running of the engine E.

In the above constructed engine E, the relief valve 105 is opened and closed in the oil control portion 90D according to the pressure of the oil 71 so that the pressure (or flow rate) of the oil 71 delivered toward the cylinder head 20 and the pressure (or flow rate) of the oil 71 delivered toward the transmission 35 are individually controlled. Therefore, in a whole engine speed range of the engine E, the oil 71 is fed in sufficient pressure or amount to the transmission 35, the crankshaft 23, and the camshafts 30 and 31. In addition, with the engine E running at a low engine speed, an oil pressure sufficient to suitably drive the variable valve timing system 60 and the hydraulically-powered tensioner lifter 55 is obtained.

Since an operation of a relief valve (not shown) provided in the sub oil passage of the eleventh oil passage 91 is similar to that of the relief valve 105 provided in the sub-oil passage 101 of the tenth oil passage 90, it will not be further described. In this embodiment, the oil control portion 90D may include an electromagnetic relief valve, rather than the mechanically-driven relief valve 105 composed of the ball 107 and the coil spring 108 as illustrated in this embodiment.

While in this embodiment, the eighth oil passage 88 branches from the location of the seventh oil passage 87 extending from the main passage 80A to the camshafts 30 and 31 so that the oil 71 is fed to the variable valve timing system 60 through the eighth oil passage 88, the main passage 80A may alternatively be coupled to the variable valve timing system 60 through an oil passage different from the seventh oil passage 87 (see two-dotted line in FIG. 7). Furthermore, the oil control portion 90D of the tenth oil passage 90 may be configured to include components instead of the main oil passage 100 and the sub-oil passage 101 provided with the relief valve 105.

Figure 9:
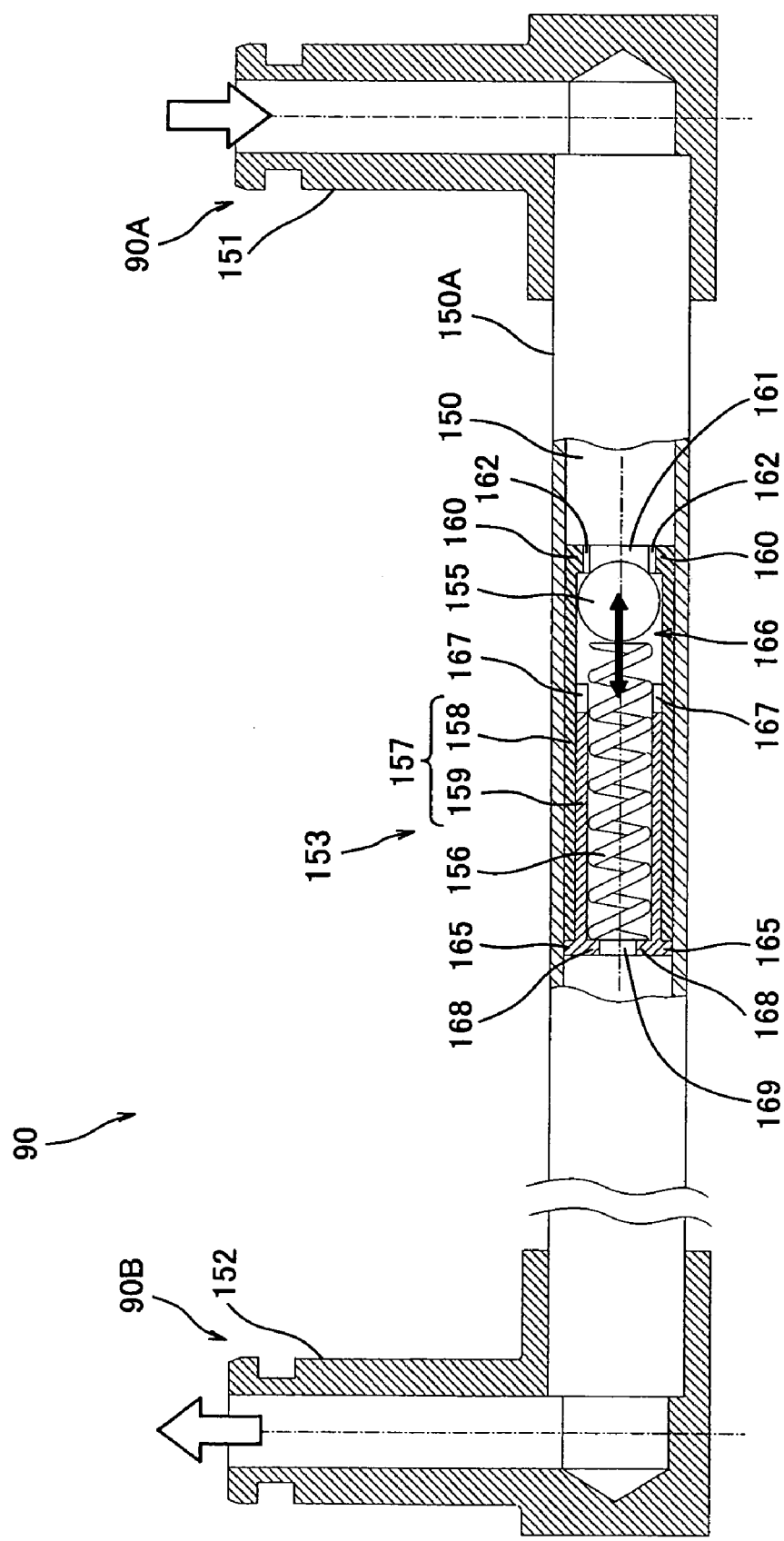
FIG. 9 is a view showing another structure of the oil control portion.

FIG. 9 is a view showing another structure of the oil control potion. As shown in FIG. 9, an oil control portion 153 is mounted between the upstream end portion 90A and the intermediate portion 90B of the tenth oil passage 90 of FIG. 4. As shown in FIG. 9, a pipe member 150A having an internal passage 150 is mounted between the upstream end portion 90A and the intermediate portion 90B of the tenth oil passage 90. An upstream end of the pipe member 150A is connected to the main passage 80A (FIG. 4) through a joint 151, and a downstream end portion of the pipe member 150A is connected to a downstream end portion 90C (FIG. 4) of the tenth oil passage 90 through a joint 152. The oil control portion 153 is provided at a position of the internal passage 150 of the pipe member 150A. The oil control portion 153 is tubular and is constructed to accommodate a ball 155 and a coil spring 156 in a housing 157. The oil control portion 153 is forcibly fitted into the internal passage 150 of the pipe member 150A.

The housing 157 includes a substantially tubular outer housing 158 configured to accommodate the ball 155 and a substantially tubular inner housing 159 that is internally fitted to the outer housing 158 and is configured to accommodate the spring 156. The outer housing 158 has an inner diameter slightly larger than a diameter of the ball 155, and is provided at an upstream end portion thereof with a reduced-diameter portion 160 protruding radially inward from an inner peripheral surface of the outer housing 158. An upstream opening 161 defined by the reduced-diameter portion 160 has a diameter slightly smaller than a diameter of the ball 155. One or a plurality of cut portions 162 are formed at the reduced-diameter portion 160 along the periphery of the upstream opening 161. With the ball 155 positioned within the outer housing 158 in contact with the reduced-diameter portion 160, the interior of the housing 157 communicates with outside through only the cut portion 162.

The inner housing 159 is internally fitted into the outer housing 158 through an opening located on a downstream side. The inner housing 159 has an outer diameter substantially equal to an inner diameter of the outer housing 158, and has an inner diameter slightly smaller than a diameter of the ball 155. An axial dimension of the inner housing 159 is smaller than an axial dimension of the outer housing 158. A flange portion 165 is formed at a downstream end of the inner housing 159 so as to protrude radially outward further than an outer peripheral portion of the inner housing 159.

With the inner housing 159 fitted into the outer housing 158, the flange portion 165 is in contact with a downstream end portion of the outer housing 158. With the inner housing 159 fitted into the outer housing 158, the ball 155 is accommodated in a space 166 formed between the reduced-diameter portion 160 of the outer housing 158 and an upstream end portion of the inner housing 159. The ball 155 is movable in the axial direction of the housing 157 in the space 166.

One or a plurality of cut portions 167 are formed at the upstream end portion of the inner housing 159 along the periphery of the inner housing 159. An opening area of the cut portion 167 is larger than an opening area of the cut portion 162. When the ball 155 moves in the flow direction of the oil to contact the upstream end portion of the inner housing 159, the space 166 is able to communicate with the interior of the inner housing 159 though only the cut portion 167. The coil spring 156 is accommodated in the interior of the inner housing 159. The coil spring 156 has a diameter substantially equal to the inner diameter of the inner housing 159, and is mounted in such a manner that an axial direction of the coil spring 156 conforms to an axial direction of the inner housing 159. A reduced-diameter portion 168 is formed at a downstream end portion of the inner housing 159 so as to protrude radially inward from an inner peripheral surface of the inner housing 159. The reduced-diameter portion 168 defines a downstream opening 169 through which the interior of the housing 157 communicates with outside. The coil spring 156 is mounted in such a manner that a downstream end of the coil spring 156 is in contact with the reduced-diameter portion 168 and an upstream end thereof is in contact with the ball 155 to apply a force to the ball 155 in an opposite direction to the flow direction of the oil in the housing 157.

When a pressure difference between the upstream side and the downstream side of the oil control portion 153 is small, the oil control portion 153 is closed with the ball 155 in contact with an inner side of the reduced-diameter portion 160 of the outer housing 158. As a result, the oil 71 flows through only the cut portion 162 formed on the reduced-diameter portion 160 of the outer housing 158. When the pressure of the oil 71 on the upstream side becomes a predetermined value or more, the ball 155 moves in the flow direction of the oil against elasticity of the coil spring 156 and contacts the upstream end portion of the inner housing 159, causing the oil control portion 153 to be opened. As a result, the oil 71 flows in a large amount through the cut portion 167, which is larger than the cut portion 162 and is formed at the upstream end portion of the inner housing 159.

In the tenth oil passage 90 constructed above, the pressure of the oil 71 in the interior of the main passage 80A is high when the rotational speed of the crankshaft 32 is high. Under this condition, the oil 71 is fed in sufficient pressure and/or amount to the crankshaft 32, and the camshafts 30 and 31, and an oil pressure sufficient to drive the variable valve timing system 60 and the hydraulically-powered tensioner lifter 55 is obtained. In addition, since the pressure of the oil 71 in the tenth oil passage 90 is high, the oil control portion 153 is opened to enable the oil 71 to be fed in sufficient pressure and/or amount to the transmission 35.

On the other hand, when the rotational speed of the crankshaft 32 is low, the pressure of the oil 71 in the interior of the tenth oil passage 90 is low. When the pressure of the oil 71 becomes a predetermined value or less, the oil control portion 153 operates to be closed. Under this condition, since the pressure of the oil 71 in the main passage 80A is maintained at a predetermined value or more and the amount of the oil flowing to the transmission oil passage decreases, the oil 71 can be fed in required amount to the crankshaft 32 and to the camshafts 30 and 31. In addition, an oil pressure sufficient to drive the variable valve timing system 60 and the hydraulically-powered tensioner lifter 55 is obtained. With the oil control portion 153 closed, the oil 71 is fed in required amount to the transmission 35 through the cut portion 162.

The oil control portion 153 illustrated in FIG. 9 enables the oil 71 to be fed in a suitable pressure and/or amount to the transmission 35 and the portions other than the transmission 35. As a matter of course, the structure illustrated in FIG. 9 may be applied to the eleventh oil passage 91. Also, a system similar to the oil control portion 90D of FIG. 8 or the oil control portion 153 of FIG. 9 may be provided in other oil passages, for example, the seventh oil passage 87 as well as in the tenth oil passage 90 and the eleventh oil passage 91.

Figure 10:
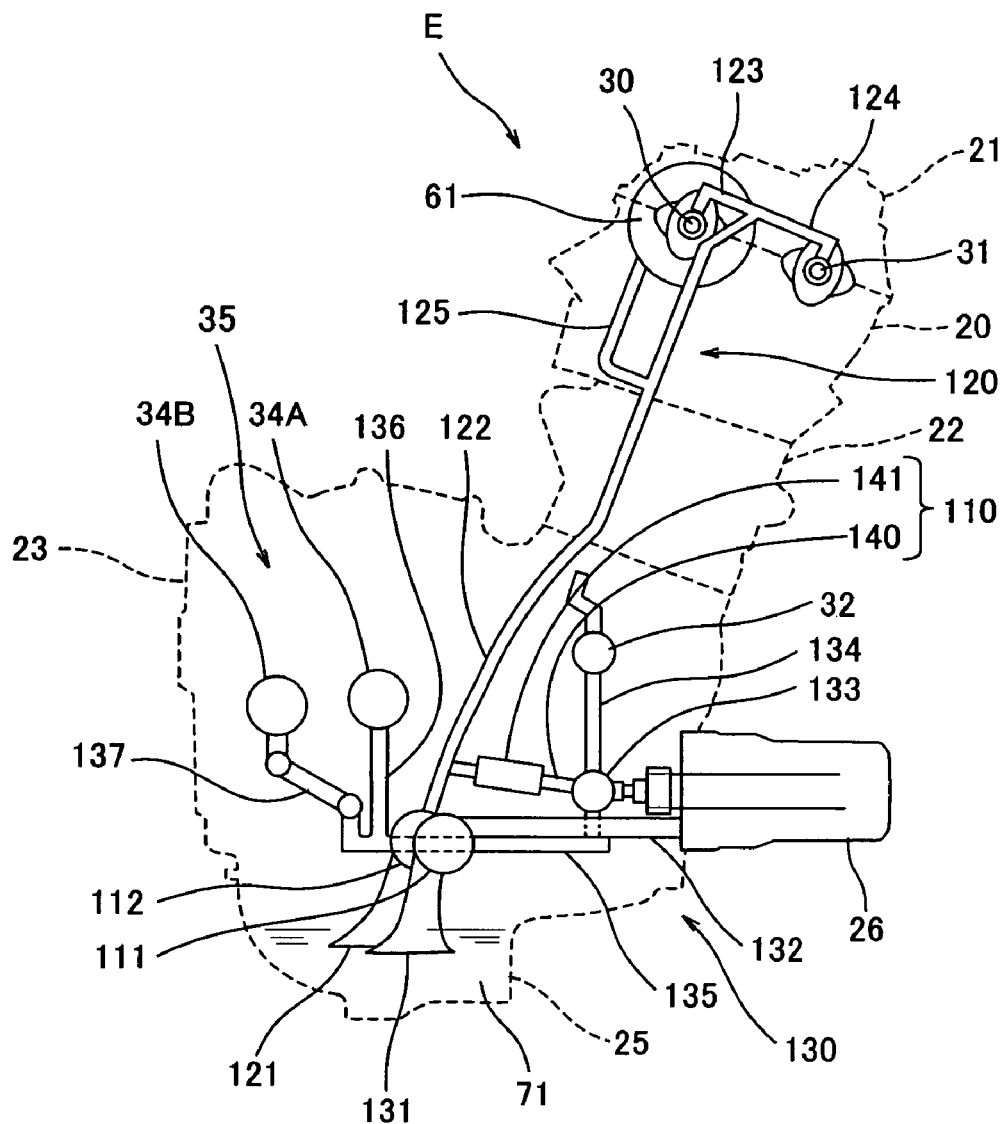
FIG. 10 is a schematic side view showing another oil feeding system of the engine of FIG. 1.

Instead of one oil pump 70 as mentioned above, a plurality of oil pumps may be mounted to form an oil feeding system. With reference to FIG. 10, the oil feeding system of the engine equipped with two oil pumps will be described.

As shown in FIG. 10, the engine E includes two oil pumps, i.e., a first oil pump 111 and a second oil pump 112, an engine body oil passage 120 through which the oil 71 suctioned up by the second oil pump 112 is delivered to the camshaft 30, the hydraulically-powered actuator 61, etc., and a transmission oil passage 130 through which the oil 71 suctioned up by the first oil pump 111 is delivered to the transmission 130.

To be specific, the engine body oil passage 120 includes an oil passage 121 configured to extend upward from the oil pan 25 to allow the oil 71 to be drawn to the second oil pump 112 therethrough, and an oil passage 122 configured to extend upward from the second oil pump 112 to the upper region of the cylinder head 20. The oil passage 122 is divided, at the upper region of the cylinder head 20, into an oil passage 123 connected to the camshaft 30 and an oil passage 124 connected to the camshaft 31. The oil 71 is fed to the camshaft 30 and the camshaft 31 through oil passage 123 and the oil passage 124, respectively. An oil passage 125 extends from a location of the oil passage 122 extending upward from the second oil pump 112, and is connected to the hydraulically-powered actuator 61 through the oil control valve (not shown in FIG. 10). The oil 71 is fed to the hydraulically-powered actuator 61 through the oil passage 125 to drive the actuator 61.

The transmission oil passage 130 includes an oil passage 131 configured to extend upward from the oil pan 25 to allow the oil 71 to be drawn to the first oil pump 111 therethrough, an oil passage 132 through which the oil 71 is delivered from the first oil pump 111 to the oil filter 26 mounted to the front portion of the crankcase 23, and a main passage 133 configured to extend in a rightward and leftward direction of the engine E to allow the oil 71 from the oil filter 26 to be delivered to the transmission 35, etc., therethrough.

In this embodiment, the transmission oil passage 130 further includes an oil passage 134 configured to extend upward from the main passage 133 to allow the oil 71 to be delivered to the crankshaft 32 therethrough, and an oil passage 135 configured to extend rearward from the main passage 133 through an inner bottom portion of the crankcase 23 to allow the oil 71 to be fed to the transmission 35 therethrough. The oil passage 135 extending toward the transmission 35 is divided, at a location under the transmission 35, into an oil passage 136 connected to the main shaft 34A and an oil passage 137 connected to a counter shaft 34B. The oil 71 is fed to the main shaft 34A and the counter shaft 34B through the oil passage 136 and the oil passage 137, respectively.

A bypass passage 140, which serves as an oil control portion 110, extends from a location near a lower portion of the oil passage 122 of the engine body oil passage 120 extending upward from the second oil pump 112, and is connected to the main passage 133 of the transmission oil passage -130. A relief valve 141 is provided in the bypass passage 140. The relief valve 141 is configured to permit the oil 71 to flow from the engine body oil passage 120 to the transmission oil passage 130, and to be opened when the pressure of the oil 71 existing on the engine body oil passage 120 side becomes a predetermined value or more. The relief valve 141 may be a known flow rate control valve, and its structure will not be specifically described.

In the engine E constructed above, the second oil pump 112 serves to deliver the oil 71 through the engine body oil passage 120 and the first oil pump 111 serves to deliver the oil 71 through the transmission oil passage 130. In other words, the second oil pump 112 enables the camshaft 30 and the camshaft 31 to be suitably lubricated, and the hydraulically-powered actuator 61 to suitably operate, and the first oil pump 111 enables the crankshaft 32 and the transmission 35 to be suitably lubricated.

If the second oil pump 112 is adapted to enable the hydraulically-powered actuator 61 to suitably operate when the engine E is running at a low engine speed, the oil 71 may be fed excessively to the hydraulically-powered actuator 61 when the engine E is running at a high speed. However, in the engine E of this embodiment, when the amount of the oil 71 fed to the hydraulically-powered actuator 61 increases, the pressure of the oil 71 in the engine body oil passage 120 increases. When the pressure of the oil 71 exceeds a predetermined value, then the relief valve 141 operates to cause the bypass passage 140 to be opened. Thereby, a surplus of the oil 71 in the engine body oil passage 120 is delivered to the main passage 133 of the transmission oil passage 130 through the bypass passage 140, and is mixed into the oil in the transmission oil passage 130. The resulting oil is fed to the transmission 35 and the crankshaft 32. As a result, whether the engine E is running at a high or low engine speed, the oil 71 is able to be fed to the components of the engine E in a suitable pressure and/or amount.

While in this embodiment, the oil passage 134 extending to the crankshaft 32 and the oil filter 26 are disposed on the transmission oil passage 130, the oil passage 134 and/or the oil filter 26 may alternatively be disposed on the engine body oil passage 120, provided that oil pumps are respectively mounted to an oil passage through which the oil is guided to an engine and an oil passage through which the oil is guided to a transmission and these oil passages are coupled to each other through a bypass passage (oil control passage) in which a relief valve is provided.

The above mentioned oil feeding system may be applied to two-cylinder or three-cylinder engines as well as the above mentioned in-line four-cylinder engine. The engine may be a straight-cylinder engine, a boxer engine or a V-type engine. The engine equipped with the oil feeding system of the present invention may be mounted in vehicles such as all terrain vehicles as well as motorcycles.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An oil feeding system of an engine equipped with a transmission configured to change a rotational speed of rotation of a crankshaft and to output the rotation, comprising:
   an oil pump configured to be driven in cooperation with the rotation of the crankshaft;
   an oil passage through which oil outflowing from the oil pump flows;
   a hydraulically-powered system including at least one of a hydraulically-powered variable valve timing system and a hydraulically-powered tensioner lifter, the variable valve timing system being configured to be driven by the pressure of the oil to change a rotational phase of a camshaft, the tensioner lifter being configured to be driven by the pressure of the oil to guide a cam chain installed around the camshaft and the crankshaft;
   wherein the oil passage includes a transmission oil passage through which the oil outflowing from the oil pump is guided to the transmission, an engine body oil passage through which the oil outflowing from the oil pump is guided to the hydraulically-powered system, and a distributing passage from which the oil outflowing from the oil pump is distributed to the transmission oil passage and the engine body oil passage which are configured to branch from the distributing passage; and
   an oil control portion configured to change a ratio between a pressure of the oil flowing through the transmission oil passage and a pressure of the oil flowing through the engine body oil passage, wherein the oil control portion is provided in the transmission oil passage, and is configured to restrict a flow rate of the oil flowing in the transmission oil passage to increase the pressure of the oil delivered to the hydraulically-powered system, when the pressure of the oil in a portion of the transmission oil passage in which the oil control portion is provided is a predetermined value or less.

2. The oil feeding system according to claim 1,
   wherein the transmission oil passage includes a first oil passage and a second oil passage that are connected in parallel;
   wherein the first oil passage and the second oil passage are coupled at upstream ends thereof to the distributing passage and at downstream ends thereof to an upstream end of a third oil passage that extends to the transmission, and the oil is distributed from the distributing passage to the first oil passage and the second oil passage and then is gathered in the third oil passage to be guided to the transmission;
   wherein the first oil passage of the transmission oil passage is partially provided with a restricting portion having a passage with a diameter smaller than a diameter of a region in the vicinity of the restricting portion; and
   wherein the oil control portion includes a valve that is provided in the second oil passage and is configured to restrict a flow rate of the oil in the second oil passage when the pressure of the oil is a predetermined value or less.

3. An oil feeding system of an engine equipped with a transmission configured to change a rotational speed of rotation of a crankshaft and to output the rotation, comprising:
- a hydraulically-powered system including at least one of a hydraulically-powered variable valve timing system and a hydraulically-powered tensioner lifter, the variable valve timing system being configured to be driven by a pressure of the oil to change a rotational phase of a camshaft, the tensioner lifter being configured to be driven by the pressure of the oil to guide a cam chain installed around the camshaft and the crankshaft;
- a first oil pump and a second oil pump configured to be driven in association with rotation of the crankshaft;
- a transmission oil passage through which the oil outflowing from the first oil pump is guided to the transmission;
- an engine body oil passage through which the oil outflowing from the second oil pump is guided to the hydraulically-powered system; and
- an oil control portion configured to change a ratio between a pressure of the oil flowing through the transmission oil passage and a pressure of the oil flowing through the engine body oil passage;
- wherein the first oil pump and the second oil pump are configured to independently feed the oil to the transmission oil passage and to the engine body oil passage, respectively.

4. The oil feeding system according to claim 3,
- wherein the oil control portion includes a bypass passage through which the transmission oil passage is connected to the engine body oil passage, and a valve configured to restrict a flow of the oil in the bypass passage;
- and wherein the valve is configured to increase a flow rate of the oil in the bypass passage flowing from the engine body oil passage to the transmission oil passage, when the pressure of the oil in the engine body oil passage is a predetermined value or more.

* * * * *